(No Model.) 3 Sheets—Sheet 1.
F. L. KING.
CLOSED CONDUIT FOR ELECTRIC RAILWAYS.
No. 529,797. Patented Nov. 27, 1894.
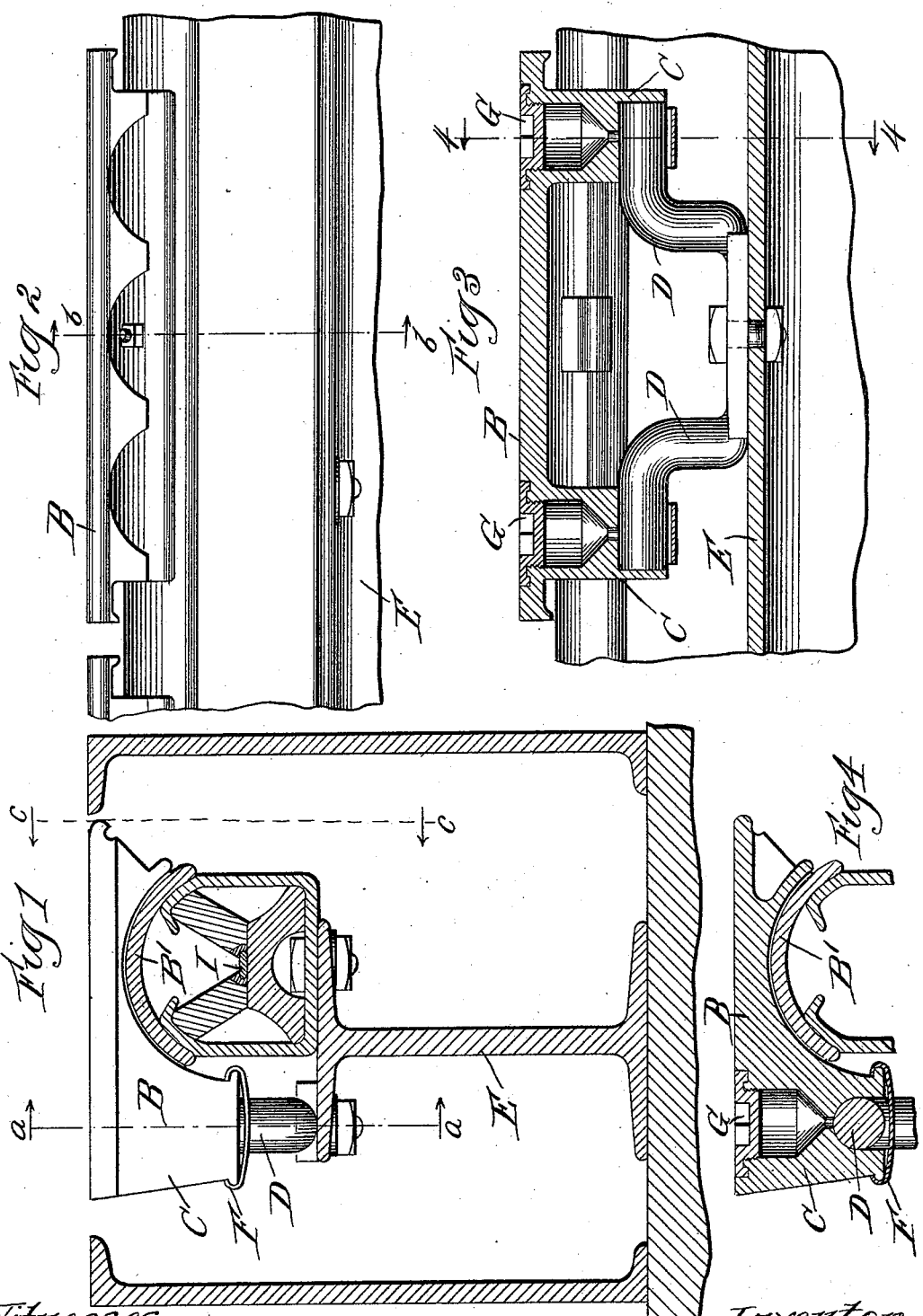
Witnesses
Wm. F. Fleming.
Harry White.
Inventor
Frederick L. King
by Frank S. Brown Atty (No Model.) 3 Sheets—Sheet 2.
F. L. KING.
CLOSED CONDUIT FOR ELECTRIC RAILWAYS.
No. 529,797. Patented Nov. 27, 1894.
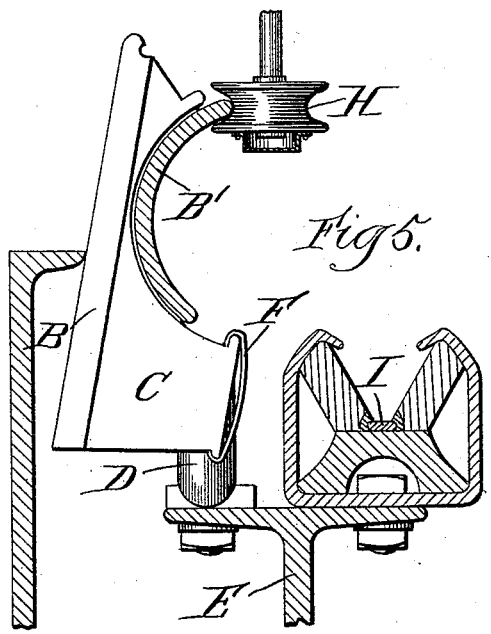
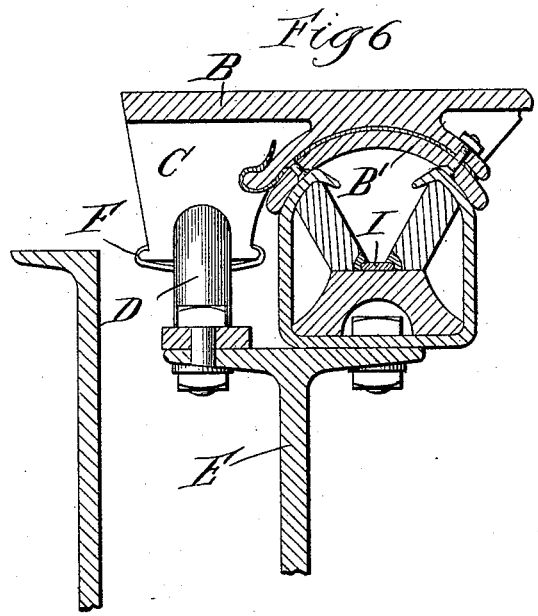
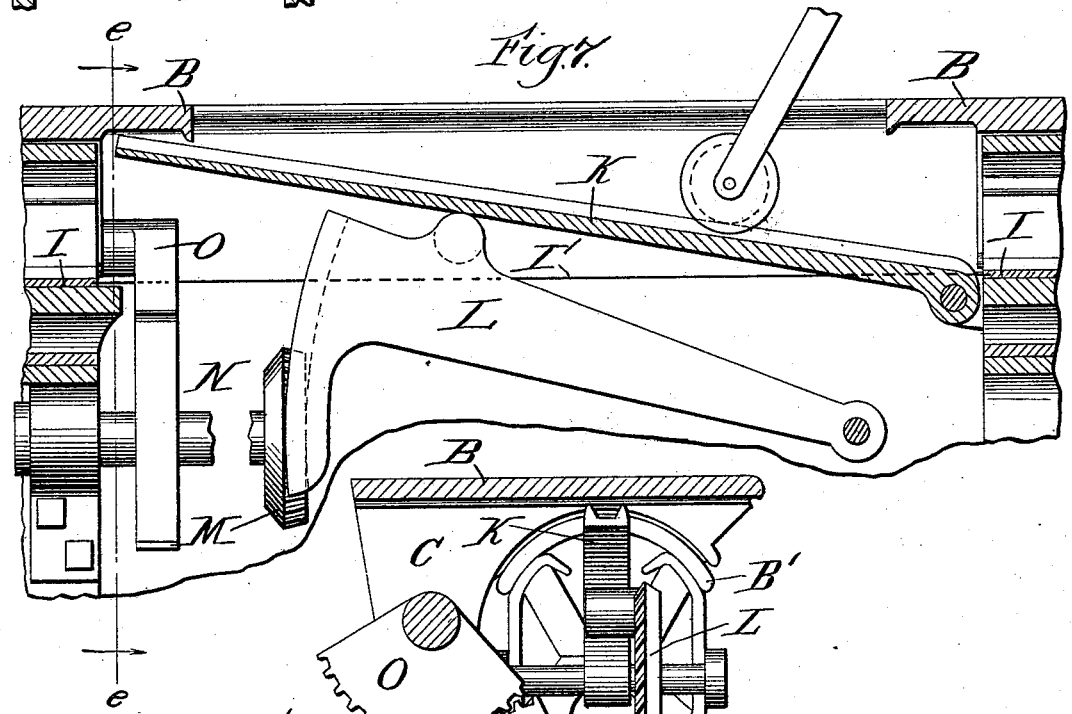
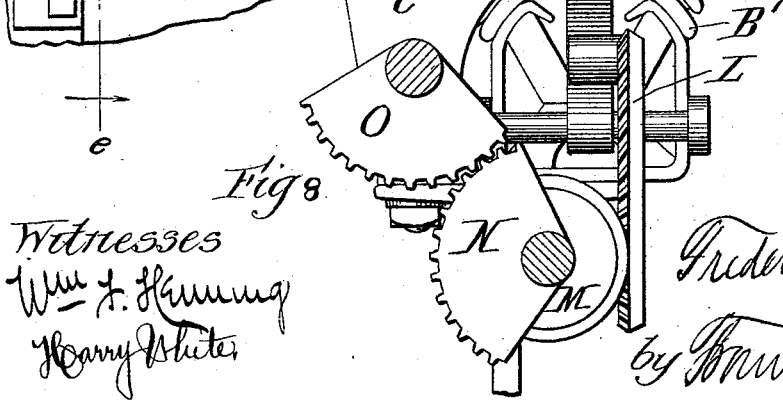

(No Model.) 3 Sheets—Sheet 3.
F. L. KING.
CLOSED CONDUIT FOR ELECTRIC RAILWAYS.
No. 529,797. Patented Nov. 27, 1894.
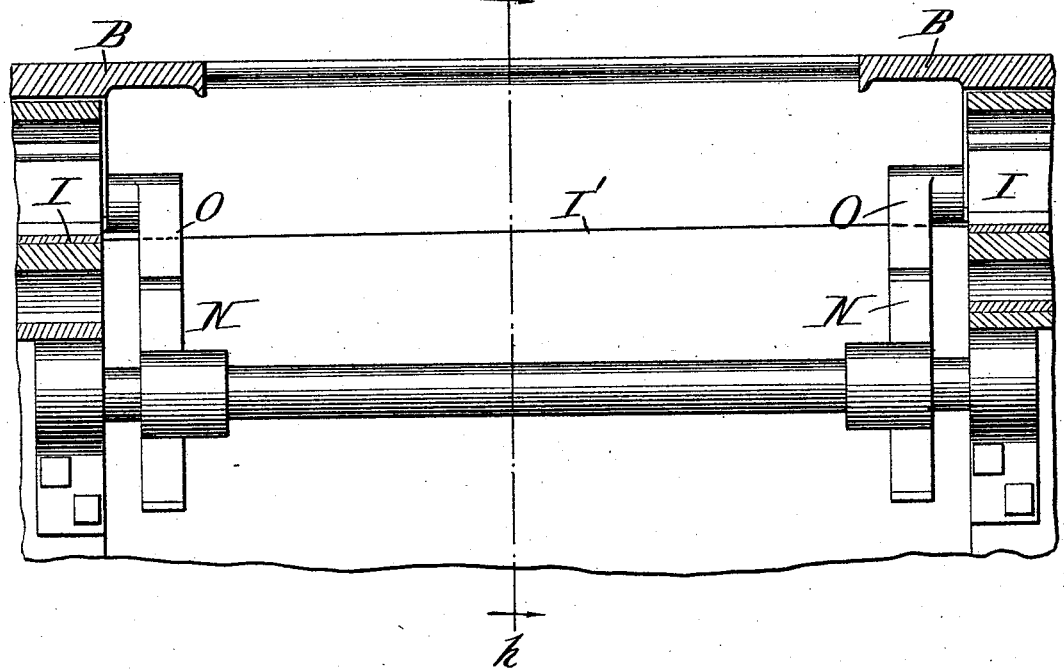
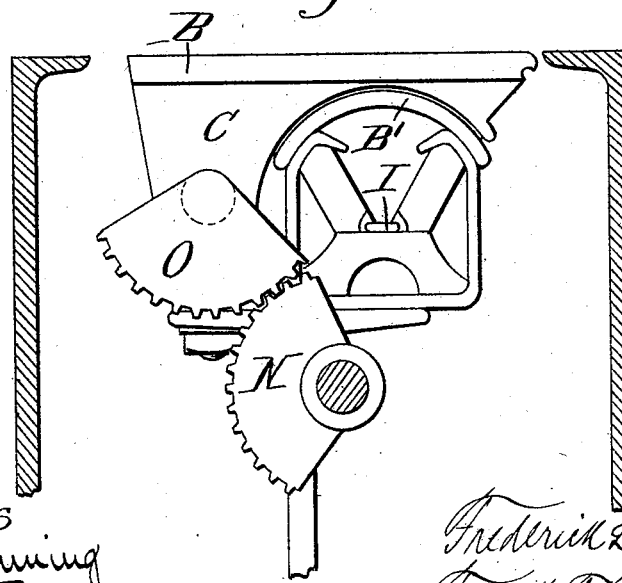

UNITED STATES PATENT OFFICE.

FREDERICK L. KING, OF CHICAGO, ILLINOIS.

CLOSED CONDUIT FOR ELECTRIC RAILWAYS.

SPECIFICATION forming part of Letters Patent No. 529,797, dated November 27, 1894.

Application filed January 15, 1894. Serial No. 496,949. (No model.)

*To all whom it may concern:*

Be it known that I, FREDERICK L. KING, a citizen of the United States, residing at Chicago, in the county of Cook and State of Illinois, have invented new and useful Improvements in Electric Railways, of which the following is a specification.

This invention relates to improvements in electric railways and particularly to the conduits for underground conductors, and means for opening and holding the same open.

The invention consists substantially in the construction hereinafter described and more particularly pointed out in the claims.

Like letters refer to the same parts in the several figures of the drawings, in which—

Figure 1 is a vertical cross section of an underground conduit containing the conductor and an outer casing therefor. Fig. 2 is a front view of the conduit with the outer casing removed looking from line c—c Fig. 1. Fig. 3 is a longitudinal section in detail of the above showing the journals therefor, upon which the cover is hinged, and is drawn on the line a—a of Fig. 1. Fig. 4 is a transverse sectional detail of the same on the line 4—4 Fig. 3. Fig. 5 is a transverse vertical section of the conduit, with the cover held in open position. Fig. 6 is a transverse section of the conduit with the cover in closed position on the line b—b Fig. 2. Fig. 7 is a longitudinal central section of the same, and is for the purpose of showing the mechanism for automatically opening the cover. Fig. 8 is a transverse section of the same on the line e—e Fig. 7. Fig. 9 is a longitudinal central vertical section of a modified arrangement of mechanism in which the gears for two movable covers are connected; and Fig. 10 is a transverse section of the same on the line h—h of Fig. 9.

This invention is intended as an improvement on that embraced in Patent No. 516,374, granted to me March 13, 1894.

The hinged cover of the conduit proper is designated by the letter B and is formed as heretofore described, to wit, of flexible material B' and transverse metal ribs B placed at suitable intervals. The metal portions of the cover have downwardly projecting lugs C as well shown in Figs. 1, 3, and 4, which at their lower ends are formed with recesses, open at the bottom and closed at the ends, as well shown in Figs. 3 and 4. The walls of these recesses constitute journal boxes for the shaft or journal upon which the cover swings. This shaft or journal is designated by the letter D and in the present instance is shown of U-shape with horizontally projecting ends at the top, which ends fit in the recesses before mentioned. The shaft or journal may be fastened to a flange on the I-beam E, or to any other suitable support, and as a convenient means for retaining the journals in the boxes I prefer to use a metal clip F which may be slipped over the T-head on the lower part of the projection C and pass under the journals. This is a very convenient arrangement for it enables the cover of the conduit to be quickly detached from its hinge or journal. I also find it desirable to vertically recess the projection C so as to afford a receptacle for lubricating substances, and this recess may be closed by a screw threaded stopper G. In some instances it may be found advantageous to retain the cover of the conduit in an open position by positive mechanical means, after it has been opened, and to this end I have shown a construction in Fig. 5 adapted for that purpose. This construction consists merely in the sheave H which depends from the moving vehicle in such position that it rests against the edge of the cover after the latter has been opened, and then holds said cover open until the vehicle has passed that particular section.

In my previous patent I illustrated and set forth magnets arranged upon the vehicle for the purpose of lifting the cover of the conduit, and in the present application I have illustrated in Figs. 7, 8, 9 and 10 positive mechanical means for effecting the same purpose. The trolley which depends from the vehicle and serves to make contact with the conductor, I, may be also arranged to actuate the mechanism which will open the cover in advance of the travel of such trolley. In the present case I have illustrated a mechanism for such purpose which I will now describe. The trolley leaves a section of the conductor I, and travels upon the hinged and inclined arm K and by its pressure causes the said arm to push down and move the lever L one edge of which is toothed and curved so as to act as a segment of a gear or segmental rack.

This segmental rack when moved downward engages the teeth of a bevel pinion M which latter is mounted upon a short shaft. The same shaft which carries the pinion M also carries a sector N which in turn meshes with a similar sector O the latter being rigidly secured to the downwardly projecting arm C of the cover B. It is to be understood that this sector O has no independent revolution, but can only turn by causing the cover B to swing on its axis D. The operation of this mechanism may, therefore, be briefly stated as follows:—The trolley runs up the inclined arm K and presses the latter down upon the lever L, the segmental rack of which moves with the lever thereby moving the pinion M, which latter causes the sector N mounted on the same shaft to vibrate and communicate motion to the companion sector O, which in turn elevates the cover to its open position; when it may be held open by the sheave H as before described. The lever L is preferably so proportioned as to almost balance by its own weight, the weight of the cover, but if desired, any suitable weight may be attached thereto. By this construction it takes but little pressure upon such lever through the arm K and trolley to overbalance and lift the cover. The continuity of the circuit through the conductor may be at this point preserved in any suitable manner, but I have shown a simple wire I' extending from one side to the other. Of course the trolley when it moves up the incline breaks contact but this does not disable the apparatus for the reason that the momentum of the vehicle at that time is sufficient to carry the trolley over the space to the other section of the conductor I. In Figs. 9 and 10 there are shown two pairs of sectors N, O, each pair being at some little distance apart, and the sectors N being at opposite ends of the same shaft. Thereby two different covers may be acted on simultaneously. This construction needs no special description other than to say that the mechanism is substantially the same as that shown in Figs. 7 and 8, except that it is duplicated and connected so as to operate as one.

It is obvious that many modifications may be made in the details of the construction shown and described without departing from the principles thereof, and I do not therefore wish to be understood as limiting myself to such exact construction.

Having thus described my invention, what I claim as new, and desire to secure by Letters Patent of the United States, is—

1. In a conduit for inclosing the conductors of electric railways, a support having journals and a cover removably pivoted to said journals; as and for the purpose set forth.

2. In a conduit for inclosing the conductors of electric railways, a hinged cover provided with journal boxes open on one side, in combination with the journal suitably supported and adapted to such boxes; substantially as and for the purpose set forth.

3. In a conduit for inclosing the conductors for electric railways, the combination of a cover provided with open journal boxes, and a journal suitably supported and adapted to such boxes, and a detachable fastening device for securing such journals in the boxes; substantially as and for the purpose set forth.

4. In a conduit for inclosing the conductors of electric railways, the combination of a cover provided with open journal boxes and with exterior ledges formed thereon, journals suitably supported and adapted to such boxes and a metal clip having bent ends adapted to slide upon the ledges and pass underneath the journals and thereby retain them in place; substantially as and for the purpose set forth.

5. In a conduit for inclosing the conductors of electric railways, the combination of journals suitably supported, with a cover for the conduit, provided with open journal boxes, adapted to such journals, and with vertical lubricating recesses communicating with the journal boxes; substantially as and for the purpose set forth.

6. In an electric railway the combination of a conductor, a chamber inclosing the same having a movable cover, gearing connected to said cover and means carried by the vehicle for operating said gearing, to open said cover and to retain it in open position while the vehicle is passing; substantially as and for the purpose set forth.

7. In an electric railway the combination of a conductor, a chamber for inclosing the same, a movable cover, gearing connected thereto for moving the same and means for automatically operating said gearing; as and for the purpose specified.

8. In an electric railway the combination of a conductor, a chamber inclosing the same having a movable cover, gearing connected to such cover and to a pivoted arm, which latter is in the path of a device depending from the vehicle; substantially as and for the purpose set forth.

9. In an electric railway the combination of a conductor, a chamber inclosing the same, and a pivoted cover for such chamber, a pivoted arm, and gearing between such pivoted arm and the movable cover; substantially as and for the purpose set forth.

10. In an electric railway the combination of a conductor, a chamber inclosing the same, a pivoted cover for such chamber, a hinged arm a toothed lever upon which said arm is supported toward its free end, and gearing connecting the toothed lever with the pivoted arm; substantially as and for the purpose set forth.

11. In an electric railway the combination of a conductor, a chamber inclosing the same, pivoted covers for such chamber, gearing connected with such covers and connected together, and a pivoted mechanism for actuating such gearing, and thereby operating the covers simultaneously; substantially as and for the purpose set forth.

12. In an electric railway the combination of a conductor, a chamber inclosing the same pivoted covers for such chamber, segmental gears rigidly secured to such covers, other segmental gears meshing with the former and arranged upon the same shaft, and connections between the same and a pivoted arm which latter is arranged in the path of a device upon the moving vehicle, whereby the covers are operated automatically and simultaneously; substantially as and for the purpose set forth.

FREDERICK L. KING.

Witnesses:
FRANK T. BROWN,
J. LAWRENCE GERRY.